Oct. 11, 1960     E. D. ANDERSON     2,955,524
GRAIN TUNNEL
Filed May 6, 1958
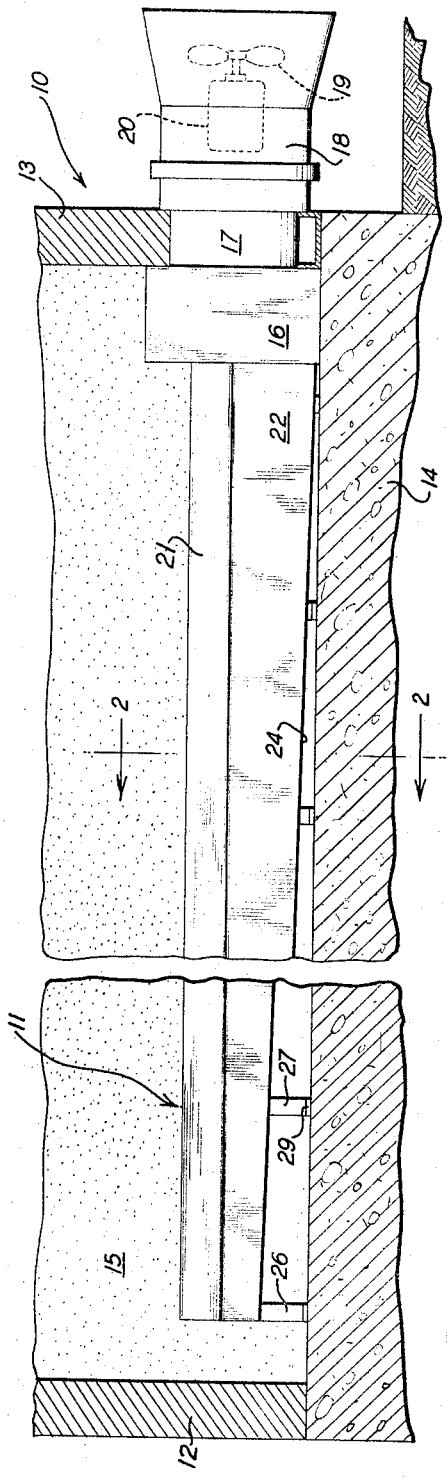
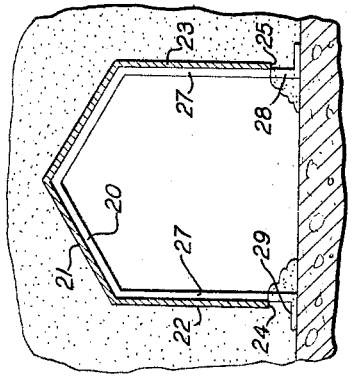
INVENTOR
EARL D. ANDERSON
BY *Shanley & O'Neil*
ATTORNEYS

United States Patent Office 2,955,524
Patented Oct. 11, 1960

2,955,524
GRAIN TUNNEL

Earl D. Anderson, Grosse Ile, Mich., assignor to National Steel Corporation, a corporation of Delaware Filed May 6, 1958, Ser. No. 733,385

2 Claims. (Cl. 98—56)

This invention relates to the storage of materials, and more particularly to ventilating tunnels for use in storage buildings adapted for the storage of granular materials such as grain, other farm crops, and chemicals and the like. The invention will be described by way of example in connection with the storage of grain.

In modern practice, large quantities of grain are stored for extended periods of time in buildings especially designed for that purpose. The type of building most generally employed is the type that may be erected at relatively low cost and which usually comprises elongated concrete slab flooring upon which the grain is piled and a building surrounding the flooring and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose one or more ventilating tunnels are first placed on the floor and then the grain is piled on the floor so as to cover the tunnel or tunnels. Each line of tunnels is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally speaking, there are three types of grain ventilation problems. One is the removal of excessive moisture from grain. Another is the controlling of the moisture distribution through the mass of grain to prevent spoilage arising from the gradual development of concentrations of moisture in regions of the grain mass. The third is the cooling of the mass of grain to prevent spoilage or damage arising from the attack of harmful insects. Ventilating tunnels provided by the present invention may be employed to solve any or all of these three problems.

When it is desired to remove excessive moisture from stored grain a relatively large mass rate of flow of air must be maintained through the grain. For this reason it is necessary to provide ventilating tunnels of relatively large cross-sectional area or a number of smaller tunnels spaced relatively close together. In cases where the grain stored includes the desired moisture content and only safe storage is to be provided, it is required that only a relatively small rate of air flow be maintained through the mass of grain, and the air circulation may be discontinuous. Consequently, ventilating tunnels of relatively smaller cross-sectional area or more widely spaced may be employed for grain ventilation where there is no problem of moisture removal.

When grain of the desired moisture content is stored in a pile and left unventilated, the moisture in the grain will migrate to the top of the pile of grain producing undesirable regions of the grain mass having excessive concentrations of moisture. In order to overcome this moisture migration, air is circulated downwardly through the grain, that is, in a direction opposite to the direction of moisture migration. For this purpose the air may be circulated for extended periods at a relatively low rate so that the grain has a substantially constant moisture content substantially throughout its volume. Thus the ventilating tunnel is connected to a suction fan or blower and air is forced downwardly through the grain. Of course tunnels designed for moisture removal or grain drying may be employed thereafter for controlling moisture distribution by providing a reduced air flow directed downwardly through the grain. However, in view of the relative size of the two types of ventilating tunnels it would be uneconomical to employ drying tunnels for grain ventilation when moisture removal is not required.

The relatively lower mass rate of air flow suitable for controlling moisture distribution is also ordinarily suitable for cooling to prevent spoilage or to reduce grain damage from insect infestation. Hence, the considerations recited in connection with controlling moisture distribution by ventilation may also be considered to apply to cooling by ventilation.

However, serious difficulties arise in connection with grain ventilating tunnels as provided heretofore. Although the previous tunnels have been capable of handling an air flow theoretically sufficient to achieve any or all of the three purposes cited above, it has nevertheless been found that in practice the desired results are not achieved uniformly throughout the body of stored material by the use of grain tunnels known to the prior art. The failure of the prior art devices to provide uniform ventilation has resulted in local overheating of the grain and insufficient moisture removal or uneven moisture distribution in portions of the grain.

In an effort to overcome these disadvantages it has been proposed to increase the air flow substantially above the theoretical requirements so that all portions of the grain mass receive adequate ventilation. In attempting to increase the air flow rate to the point that all portions of the grain mass receive adequate ventilation, the non-uniform pattern of ventilation continues at the higher levels of air flow the same as at the lower or theoretically adequate levels of air flow. The result is that certain portions of the grain mass are seriously over-ventilated with resultant excessive drying and shrinkage, to say nothing of the fact that the ventilation power consumption is excessive and the cost of storage correspondingly high. Thus, the prior art has presented no more than a choice between under-ventilating certain portions of the grain mass or over-ventilating certain other portions of the grain mass.

Accordingly, it is an object of the present invention to provide ventilating tunnel construction that overcomes the problems outlined above.

It is another object of the present invention to provide ventilating tunnel construction which will assure substantially uniform ventilation throughout the stored material.

Still another object of the present invention is the provision of ventilating tunnel construction which can be installed at the storage site by relatively unskilled labor.

Finally, it is an object of the present invention to provide ventilating tunnel construction which will be relatively simple and inexpensive to manufacture, easy to install or remove, maintain and repair, and rugged and durable in use.

Other objects and features of the present invention will become apparent from the following detailed description considered in connection with the accompanying drawing. It is to be expressly understood, however, that the drawing is designed for purposes of illustration only and not as defining or limiting the invention, reference for the latter purpose being had to the appended claims.

In the drawing, in which similar reference characters denote similar elements throughout the several views:

Figure 1 is a view partly in section and partly in elevation showing a portion of a grain storage building including a ventilating tunnel constructed in accordance with the principles of the present invention; and Figure 2 is an enlarged cross-sectional view taken on the line 2—2 of Figure 1.

With reference more particularly to Figure 1 of the drawing, a grain storage building 10 is shown provided with an elongated grain ventilating tunnel 11 constructed in accordance with the principles of the present invention. The building 10 includes end walls 12 and 13, and side walls and roof (not shown) and is provided with a concrete slab flooring 14 upon which a mass of grain 15 is supported in a pile.

The end of tunnel 11 adjacent end wall 13 is connected to adapter 16. The adapter 16 may be formed of sheet metal to provide a chamber or plenum communicating with the tunnel through a suitable opening at one of its ends, and being provided at its other end with an extension 17 passing through end wall 13 and connected to a fan housing 18. A ventilating gas pump or fan 19 driven by an electric motor 20 or other power source is positioned within fan housing 18 and in the illustrated embodiment is adapted upon operation to circulate air through the grain and into tunnel 11. It will be understood that fan 19 may if desired be so arranged as to supply air under positive pressure to tunnel 11 to move air through the grain in the opposite direction.

Tunnel 11 is in the form of an elongated arch structure comprising rigid metal sheets connected together to form an elongated sheet metal covering 21 which is concave and opens downwardly. Sheet 21 is formed to concave shape by bending along a plurality of parallel longitudinally extending bend lines so as to provide a plurality of flat, uniplanar longitudinally extending panels each of which is disposed at oblique angles to its immediately adjacent panels. The two panels on opposite sides of sheet 21 comprise a pair of downwardly depending side portions 22 and 23 disposed in parallel vertical planes. Side portions 22 and 23 terminate downwardly in longitudinally extending opposite side edges 24 and 25, respectively.

Edges 24 and 25 are disposed contiguous to floor 14 and are spaced above floor 14 throughout their length a distance which increases progressively from their ends adjacent adapter 16 to their ends at the end of the arch structure remote from adapter 16. Spacer means are provided for supporting sheet 21 on floor 14 with edges 24 and 25 spaced above floor 14 in the inclined relationship described above, comprising straps 26 which are in the form of arches bent from bar stock to have an outer contour complementary to the inner contour of sheet 21. Straps 26 have vertical parallel legs 27 which in turn have portions 28 extending downwardly beyond side edges 24 and 25 and which each terminate at their lower ends in feet 29 resting on floor 14 to support the arch structure. The various straps 26 are identical in construction so that sheet 21 is maintained substantially horizontal in the sense that its upper profile and its bend lines are horizontal so that edges 24 and 25 thereof will have their predetermined inclination and spacing from floor 14. Straps 26 are secured within sheet 21 to the inner side thereof as by brazing, welding, riveting or the like. A plurality of aligned straps 26 is thus provided which are spaced apart longitudinally along sheet 21 and which provide substantially the entire support for the arch structure.

The arch structure thus comprises a tunnel such that when a mass of superposed granular material 15 is disposed thereon, a longitudinally extending gas passageway will be preserved within the tunnel full length thereof. The granular material will to some extent move within the tunnel beneath edges 24 and 25 and will come to rest at its angle of repose as indicated in Figure 2, but not to an extent sufficient to close any portion of the tunnel. Thus, by virtue of the inclination of edges 24 and 25, the space between sheet 21 and floor 14 and hence the area of grain through which ventilating gas may pass into or out of the tunnel progressively increases from the right end of the tunnel to the left end of the tunnel as seen in Figure 1. In this way, the flow of ventilating gas into or out of the tunnel at any point lengthwise of the tunnel tends to be maintained substantially constant despite the normal variations of pressure lengthwise of the tunnel. Of course, the inclination of edges 24 and 25 and hence the ventilating gas passageway provided at any point along the tunnel will vary somewhat according to the nature of the granular material to be ventilated and its moisture content, as will also the operating characteristics of the fan.

It will be evident that sheet 21 need not be polyhedral but may be arcuate, in which case straps 26 will have a complementary configuration. Similarly, it is not necessary that both of side edges 24 and 25 be inclined so as to provide space on either side of sheet 21, but rather it is necessary only that at least one of these edges be inclined. The other edge can be, for example, horizontal and spaced from floor 14 or can extend down closely adjacent or in contact with floor 14. Similarly, it is not necessary that edges 24 and 25 be straight nor that their distance above the floor 14 increase progressively from the extreme right end thereof to the extreme left end thereof as seen in Figure 1, but only that the progressive increase in distance take place from adjacent the right end most of the way toward the left end thereof as seen in Figure 1. Although sheet 21 is shown as a unitary sheet, it may of course be constructed from longitudinally aligned sections (not shown) for ease of assembly, disassembly, storage and shipping.

From a consideration of the foregoing description, it will be obvious that all of the initially recited objects of the present invention have been achieved.

Although the present invention has been described and illustrated in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

What is claimed is:

1. An elongated ventilating tunnel adapted to be positioned on the floor of a storage building beneath a mass of granular material and the like to ventilate the mass of granular material, comprising an elongated arch structure of uniform height and width throughout at least a major portion of its length and of gas impervious material and having a pair of longitudinally extending opposite side edges adapted to be disposed contiguous to the floor of a storage building, and support means for the arch structure comprising spacer means spaced apart along the length of the arch structure and extending below at least one said side edge of the arch structure and adapted to rest on the floor of a storage building and supportingly interconnected with the arch structure to support said at least one side edge of the arch structure above the floor, the distance by which said spacer means extends below said at least one side edge of the arch structure progressively increasing from adjacent one end of the arch structure toward the other end of the arch structure thereby to position said at least one side edge of the arch structure above the floor of a storage building a distance which progressively increases from adjacent said one end of the arch structure toward said other end of the arch structure so that when the tunnel is positioned on the floor of a storage building beneath a mass of granular material with said one end of the arch structure in fluid communication with one side of a ventilating gas pump the mass rate of flow of ventilating gas between the floor and said at least one side edge of the arch structure will tend to be substantially uniform throughout at least a major portion of the length of the arch structure.

2. An elongated ventilating tunnel as claimed in claim 1, said arch structure being imperforate and having its upper side exposed and adapted to contact and directly support a portion of a mass of granular material.

References Cited in the file of this patent

UNITED STATES PATENTS

| | | |
|---|---|---|
| 1,506,904 | Harrison | Sept. 2, 1924 |
| 2,145,222 | Gunter | Jan. 24, 1939 |
| 2,572,955 | Schumacher | Oct. 30, 1951 |
| 2,705,910 | Collins | Apr. 12, 1955 |

FOREIGN PATENTS

| | | |
|---|---|---|
| 1,737 | Great Britain | 1899 |